United States Patent
Salesse-Lavergne

(10) Patent No.: US 10,643,481 B2
(45) Date of Patent: May 5, 2020

(54) METHOD AND A DEVICE FOR AVOIDING AN OBJECT BY DETECTING ITS APPROACH TO AN AIRCRAFT

(71) Applicant: AIRBUS HELICOPTERS, Marignane (FR)

(72) Inventor: Marc Salesse-Lavergne, Allauch (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 16/117,807

(22) Filed: Aug. 30, 2018

(65) Prior Publication Data
US 2019/0088146 A1    Mar. 21, 2019

(30) Foreign Application Priority Data
Aug. 31, 2017 (FR) ...................... 17 70907

(51) Int. Cl.
G08G 5/04    (2006.01)
G08G 5/00    (2006.01)
(Continued)

(52) U.S. Cl.
CPC ............. *G08G 5/045* (2013.01); *G05D 1/101* (2013.01); *G08G 5/0008* (2013.01);
(Continued)

(58) Field of Classification Search
CPC .. G05D 1/101; G06T 7/20; G06T 7/50; G06T 7/70; G06T 2201/10025;
(Continued)

(56) References Cited

U.S. PATENT DOCUMENTS

| | | |
|---|---|---|
| 6,793,173 B2 | 9/2004 | Salesse-Lavergne |
| 7,706,979 B1 | 4/2010 | Herwitz |
| 8,965,679 B2 | 2/2015 | Euteneuer et al. |
| 2002/0133294 A1 | 9/2002 | Farmakis et al. |

(Continued)

FOREIGN PATENT DOCUMENTS

| | | |
|---|---|---|
| EP | 2200006 A1 | 6/2010 |
| FR | 2830630 A1 | 4/2003 |

(Continued)

OTHER PUBLICATIONS

French Search Report for French Application No. FR 1770907, Completed by the French Patent Office, dated Jun. 13, 2018, 8 pages.

*Primary Examiner* — Dale Moyer
(74) *Attorney, Agent, or Firm* — Brooks Kushman P.C.

(57) ABSTRACT

A method and a device for avoiding an object by detecting its approach to an aircraft. After detecting an object in the vicinity of an aircraft and detecting its approach, a first track for the object and a second track for the aircraft are estimated from successive first states for the object and successive second states for the aircraft. Thereafter, a minimum distance ($d_m$) between the first track and the second track is estimated and a warning is triggered as soon as the minimum distance is less than a first threshold so as to warn a crew of the aircraft of a risk of collision. Finally, if the minimum distance is less than a second threshold, an avoidance maneuver is performed automatically by the aircraft in order to move away from the first track, and thereby avoid any risk of collision with the object.

18 Claims, 1 Drawing Sheet

(51) Int. Cl.
  *G05D 1/10* (2006.01)
  *G06T 7/50* (2017.01)
  *G06T 7/70* (2017.01)
  *G06T 7/20* (2017.01)

(52) U.S. Cl.
  CPC ......... G08G 5/0021 (2013.01); G08G 5/0078 (2013.01); G08G 5/0086 (2013.01); *G06T 7/20* (2013.01); *G06T 7/50* (2017.01); *G06T 7/70* (2017.01); *G06T 2207/10028* (2013.01); *G06T 2207/30241* (2013.01); *G06T 2207/30261* (2013.01)

(58) Field of Classification Search
  CPC .......... G06T 2207/30261; G08G 5/008; G08G 5/0021; G08G 5/0078; G08G 5/0086; G08G 5/045; G01S 13/9303
  See application file for complete search history.

(56) References Cited

U.S. PATENT DOCUMENTS

| | | | |
|---|---|---|---|
| 2003/0137444 A1* | 7/2003 | Stone | G08G 5/0008 342/30 |
| 2009/0088972 A1* | 4/2009 | Bushnell | G01C 23/005 701/414 |
| 2009/0259402 A1* | 10/2009 | Gates | G08G 3/02 701/301 |
| 2012/0209457 A1 | 8/2012 | Bushnell | |
| 2014/0249738 A1* | 9/2014 | Euteneuer | G01S 13/9303 701/301 |
| 2017/0248421 A1* | 8/2017 | Cope | G08G 5/0021 |
| 2018/0091797 A1* | 3/2018 | Armatorio | H04N 13/239 |

FOREIGN PATENT DOCUMENTS

| | | |
|---|---|---|
| WO | 2016029253 A1 | 3/2016 |
| WO | 2016053196 A1 | 4/2016 |
| WO | 2016189112 A1 | 12/2016 |

* cited by examiner

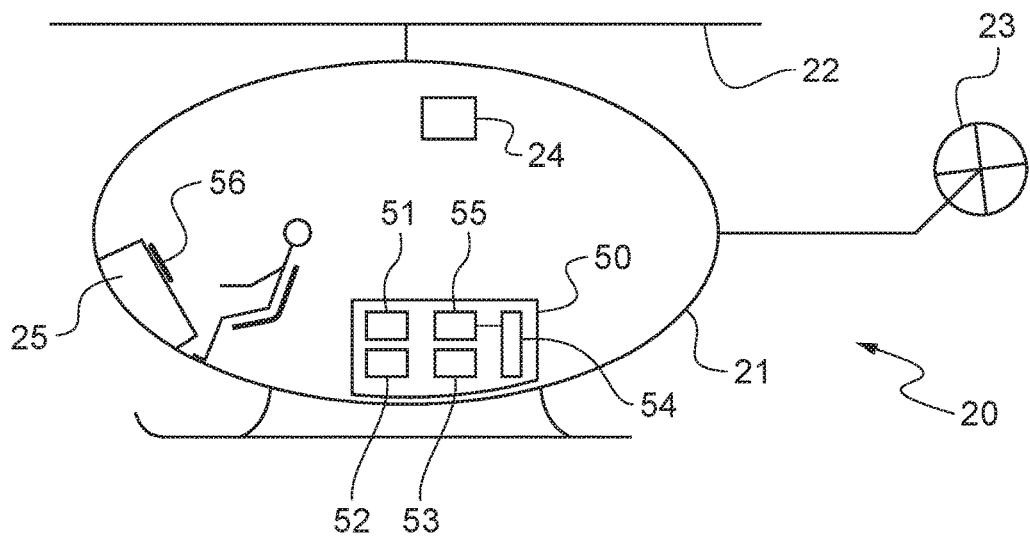
Fig.1
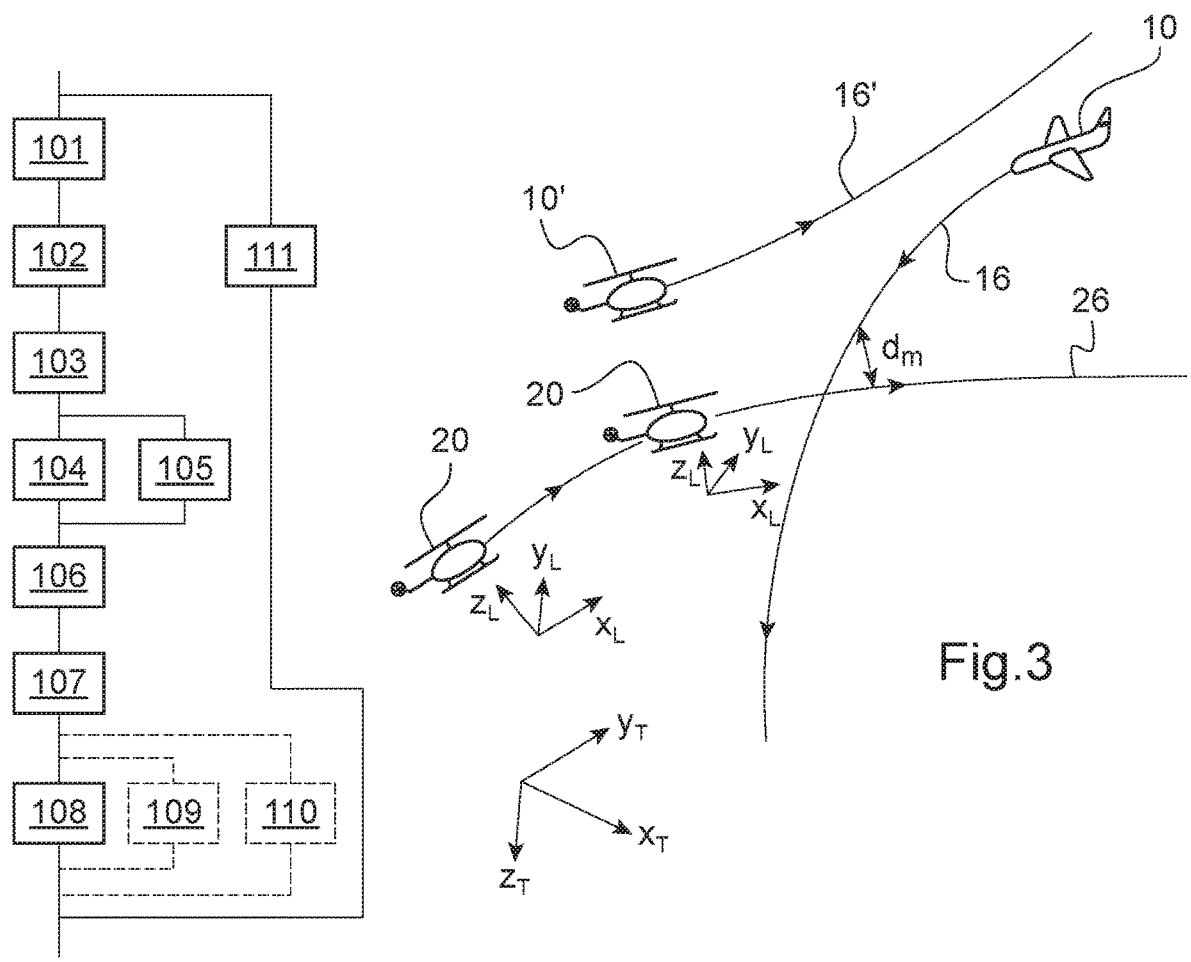
Fig.2
Fig.3

METHOD AND A DEVICE FOR AVOIDING AN OBJECT BY DETECTING ITS APPROACH TO AN AIRCRAFT

CROSS-REFERENCE TO RELATED APPLICATIONS

This application claims priority to French patent application No. FR 1770907 filed on Aug. 31, 2017, the disclosure of which is incorporated in its entirety by reference herein.

BACKGROUND OF THE INVENTION

(1) Field of the Invention

The present invention relates to the general technical field of assisting the piloting of aircraft, and in particular to the fields of detecting and avoiding objects that may be stationary or moving.

The present invention relates more particularly to a method of avoiding an object by an aircraft detecting its approach, and also to a device for performing the method and to an aircraft including such a device.

2) Description of Related Art

A stationary object may be formed for example by the terrain in the vicinity of the aircraft, by a building, by a pylon, or indeed by a cable. A moving object may be formed for example by another aircraft, by a drone, or indeed by a bird. Below, the term "obstacle" is used to designate a stationary object and the term "intruder" is used to designate a moving object.

Nowadays, aircraft have piloting assistance systems known as terrain avoidance warning systems (TAWS).

Such TAWS systems serve to indicate dangerous obstacles and relief situated ahead on the track of the aircraft progressively as they approach. Such TAWS systems include in particular a function of avoiding relief being overflown that is known as forward-looking terrain avoidance (FLTA). Such a system thus makes it possible to produce warnings automatically as a function of databases concerning relief and any obstacles being overflown, possibly together with an avoidance track when the track of the aircraft interferes with the relief or indeed with an obstacle.

Another system known as a ground proximity warning system (GPWS) serves to warn the pilot of the aircraft of ground in its proximity.

Research is actively being undertaken to improve the effectiveness of such systems by using novel sensors, e.g. such as systems based on laser scanning. Although effective, such systems remain expensive at present. In this context, imaging systems may constitute an alternative and contribute to making it easier to recognize obstacles, and may indeed be integrated in a set of sensors relying on various different technologies.

Furthermore, rotorcraft, also known as rotary wing aircraft, fly very often at very low altitude. There is a major risk of flying in the proximity of obstacles, and in particular of cables that are difficult to detect visually, so detecting such obstacles constitutes a major concern for flight safety. Specific terrain avoidance warning systems that are adapted to rotorcraft have therefore been developed, and they are known as helicopter terrain avoidance warning systems (HTWAS).

Furthermore, rotorcraft often operate in zones where flight is not controlled, so the risk of colliding with other aircraft is likewise significant. Traffic and collision avoidance systems (TCAS) and systems for exchanging data between aircraft known as "automated dependence surveillance-broadcast in" (ADSB-in) systems have been developed or are being studied. The TCAS system in compliance with standard II makes use in particular of an avoidance function in co-operation between aircraft. However, those systems are expensive and complex to install on rotorcraft because of the large areas needed for their antennas.

Furthermore, the use of drones of various sizes is becoming widespread and is increasing rapidly. Under such circumstances, the risk of an aircraft colliding with a drone is also increasing. Nevertheless, apart from its small size, detecting and identifying a drone, like detecting and identifying a bird, is difficult and requires concentrated attention by the crew of the aircraft. Under all circumstances, such detection and identification runs the risk of occurring late and therefore of requiring an avoidance maneuver that often becomes rough.

Consequently, automating such an avoidance maneuver is becoming a necessary safety measure, and automatic detection and avoidance systems have been developed and are known as "sense and avoid systems".

For example, Document WO 2016/189112 describes a collision avoidance system for wheeled vehicles. The track of an object is estimated as a result of detecting the object successively in a plurality of positions. After a future track has been predicted for the object, a probability of collision is estimated and a warning is triggered if that probability is greater than a predetermined threshold. An automatic avoidance maneuver may also be performed, such as braking or a change of track.

Also known is Document EP 2 200 006, which describes a method of estimating the state of an object and of transmitting that state to a collision detection and avoidance system. That method is for an aircraft and it makes use of successive images of an object in order to estimate the state for the object, such as its speed and its position, under assumptions concerning minimum and maximum distances between the aircraft and the object.

Furthermore, Document U.S. Pat. No. 8,965,679 describes a device and a method enabling a safety distance to be maintained between an unmanned aircraft and an intruder. Specifically, when a distance is detected between the tracks of an intruder and of the aircraft that is less than a predetermined threshold, an avoidance solution is prepared as a function of the track of the intruder, with the aircraft turning to its left, for example, if the intruder is going to the right of the aircraft, and while also taking account of constraints associated with the relief in the vicinity.

Document U.S. Pat. No. 7,706,979 describes a device fitted to a drone and modifying the speed vector or indeed the acceleration vector of the drone when the track of the drone is situated at a distance of closest approach from the track of another aircraft, that distance is less than a minimum threshold. The way this distance of closest approach varies between the two tracks is defined by a polynomial and the minimum value of this distance of closest approach is obtained by solving an equation of third or higher degree. The position and the speed of the other aircraft may be obtained by means of a radar or indeed an ADSB data receiver.

Document US 2012/0209457 describes a method and a system for managing the distance of closest approach between the tracks of two aircraft defining an avoidance maneuver for an aircraft so as to maintain some minimum distance of closest approach between the tracks. The tracks of the aircraft may be defined by various means, e.g. by a camera, by a radar, or indeed by a laser measurement system.

Also known is Document WO 2016/029253, which describes an image-taking system for an aircraft, that system including a system for detecting the closest point of approach of the aircraft with an aircraft situated in the proximity. That system for detecting the closest point of approach includes in particular an ADSB data receiver and it makes use of position data provided by the aircraft situated in the proximity in order to estimate the distance between the two aircraft. That system for detecting the closest point of approach determines in particular how the distance of closest approach between the two aircraft varies as a function of time in the form of a polynomial function of time. That system for detecting the closest point of approach can also indicate that the distance of closest approach between the two aircraft is too small and inform the pilot of the aircraft.

In addition, Documents WO 2016/053196 and US 2002/0133294 form part of the technological background of the invention.

Furthermore, detecting obstacles and avoiding them automatically is the subject of numerous studies, in particular in the field of robotics. Avoidance tracks are prepared mainly in two dimensions, whereas the avoidance tracks followed by an aircraft are more effective if they are prepared in three dimensions. Nevertheless, searching for avoidance tracks in three dimensions leads to complexity that is considerably greater than with two dimensions.

The effectiveness of the avoidance track depends firstly on minimizing uncertainty about the state of an object approaching the aircraft, typically its position, its speed, and/or its acceleration. This effectiveness also depends on decisions taken to adapt to the uncertainty about this state, in particular in order to anticipate future movements of the object when it is a moving object, i.e. an intruder. Finally, the effectiveness depends on the avoidance track proper, which must be established in a manner that is realistic, optimum, and appropriate both for the aircraft and for the object in order to ensure that the avoidance is reliable and successful.

A detection and avoidance method must therefore generate a warning and/or automatically perform an avoidance maneuver simultaneously at the opportune moment, while remaining reliable and safe in terms of the potential for avoiding the detected object.

BRIEF SUMMARY OF THE INVENTION

Under such circumstances, an object of the present invention is to provide a method for enabling an aircraft to avoid an object by detecting the approach of the object, which method is unaffected by the above-mentioned limitations, in particular by making use of the distance between the estimated track for the object, when it is a moving object, and the estimated track for the aircraft so as to evaluate the risk of collision and anticipate collision if the margin becomes too small, by warning the crew of the aircraft or else by performing an avoidance maneuver.

In this context, the present invention proposes a method of avoiding an object by detecting its approach to an aircraft, the method comprising the following steps:

detecting an object approaching the aircraft;

making a first estimate of successive first states for the object;

making a second estimate of successive second states for the aircraft;

making a first characterization of a first track for the object;

making a second characterization of a second track for the aircraft;

making a third estimate of a distance between the first track for the object and the second track for the aircraft;

making a fourth estimate of a minimum distance between the first track for the object and the second track for the aircraft; and triggering an alarm when said minimum distance is less than a first threshold.

This method is suitable both for detecting stationary objects, i.e. the terrain in the vicinity of the aircraft and any obstacle such as a building, a pylon, or indeed a cable, for example, and also for detecting moving objects, namely an intruder traveling in the vicinity of the aircraft, such as another aircraft, a drone, or indeed a bird, for example.

The object is detected by a detector device of the invention. The detector device also serves to estimate the first successive states for the object. These first states are constituted by the position, the speed, and the acceleration of the object. These position, speed, and acceleration are defined by the detector device relative to the aircraft, i.e. in a reference frame that is local to the aircraft.

It can happen that the acceleration of the object cannot be estimated by the detector device. Under such circumstances, the acceleration may be assumed to be constant and estimated on the basis of speeds of the object, or else it may be considered as being zero, with the speed of the object then being substantially constant.

By way of example, the object detector device may be formed by an electromagnetic wave detector system, e.g. a radio detection and ranging (RADAR) system. This electromagnetic wave detector system includes in particular both a generator and a receiver of electromagnetic waves. The detector system uses the electromagnetic waves to detect the presence of an object in the vicinity of the aircraft, typically by delivering radar "plots", and it may also estimate the successive first states for the object.

The object detector device may also be an optical detector system, e.g. using optical telemetry. Typically, the optical detector system serves to scan the vicinity of the aircraft by successively emitting and receiving a light beam, e.g. a laser beam. As a result, an optical detector system serves to detect the presence of an object in the vicinity of the aircraft and to estimate the successive first states for the object. By way of example, an optical detector system may be of the light detection and ranging (LIDAR) type.

The object detector system may also be an imaging system having at least one camera suitable for delivering a succession of images of the vicinity of the aircraft. Thereafter, these successive images of the vicinity of the aircraft can be processed using existing known techniques serving to detect the presence of an object in the vicinity of the aircraft and to estimate the relative position and the relative speed for the object and also its acceleration, and thus estimate the successive first states for the object.

The image processing and making the first estimate of the successive first states for the object are performed by at least one calculation device present in the aircraft. The calculation device may be dedicated to these tasks only, dedicated to performing the entire method of the invention, or indeed shared with one or more other functions of the aircraft. For example, the calculation device may comprise a calculator, a processor or a computer, and maybe the flight computer of the aircraft.

In addition, the imaging system may include at least two cameras having different focal lengths in particular in order to obtain a better scan of the vicinity of the aircraft. Specifically, using two cameras with different focal lengths serves advantageously firstly to have a wider field of view using the short focal length camera, and secondly to zoom with the longer focal length camera so as to have a narrow field of view but with greater accuracy of a particular zone in the vicinity of the aircraft, and in particular a zone where an intruder has been detected.

Nevertheless, an imaging system can encounter problems with object observability, e.g. as a function of the size of the object, its shape, and/or its distance from the aircraft. Under such circumstances, assumptions may need to be made about the size of the object and its range of speeds. Various classes of object can thus be defined as a function of ranges for sizes and for associated speeds.

A plurality of assumptions may be taken into account simultaneously, with the size of the object in the image then serving to estimate the distance between the object and the aircraft as a function of each specific class. It is then possible to verify consistency between each class and speed range. For each consistent class, a minimum distance between the first track for the object and the second track for the aircraft is then estimated and the method of the invention may make use of the minimum values of the minimum distances associated with each of the classes, for example.

The detector device may also combine both an imaging system and an electromagnetic wave detector system or indeed an optical telemetry system. As a result, the imaging system serves in particular to estimate angles between the object and the aircraft, while the electromagnetic wave detector system or indeed the optical telemetry system serves advantageously to estimate the current distance between the object and the aircraft. Consequently, the object detector device limits or even eliminates problems of object observability. Detection of the object is then more accurate and faster, thereby improving the first estimate of first states for the object.

In addition, combining a plurality of detector devices makes it possible to create asymmetry of means, which is advantageous for the safety of the avoidance system of the invention. For example, an optical telemetry system can detect an object situated in shadow, which is therefore not very visible, and might potentially not be detected by the imaging system.

The object detector device may also be an ADSB-in system for exchanging data between aircraft and also serving to provide the first successive states for an object when that object is another aircraft likewise fitted with an ADSB-in system for exchanging data.

Analyzing first states for the detected object makes it possible to detect whether the object is approaching the aircraft, and if so, to trigger the following steps of the method of the invention, or whether the object is stationary relative to the aircraft or indeed moving away from the aircraft, in which case application of the method is then limited to the step of detecting any object that is approaching the aircraft.

The successive second states for the aircraft are estimated by the aircraft positioning device. These second states are constituted by the position, the speed, and the acceleration of the aircraft. These position, speed, and acceleration of the aircraft are generally estimated by the positioning device in absolute manner in a terrestrial reference frame.

By way of example, the positioning device may be a global navigation satellite system (GNSS) type satellite receiver. The positioning device may also be formed by an inertial unit. An inertial unit is an instrument capable of integrating the movement to which it is subjected, in particular accelerations and angular velocities, so as to provide estimates of its orientation, its linear speed, and also its position.

Once the first successive states for the object and the second successive states for the aircraft are known, a first track for the object and a second track for the aircraft are defined respectively from these successive first states for the object and successive second states for the aircraft.

The first track thus establishes the path previously followed by the object and makes it possible to predict the future path of the object. The second track does the same for the aircraft. In the particular circumstance where the object is stationary, the first track is limited to a single point in the terrestrial reference frame.

In order to be compared, the first track for the object and the second track for the aircraft need to be established in a common reference frame. Preferably, the common reference frame is the terrestrial reference frame in which the second states for the aircraft are estimated. In order to establish the first track for the object in this terrestrial reference frame, it is typically possible to transfer the first states for the object into this terrestrial reference frame and then to establish the first track in this terrestrial reference frame, or else to establish the first track in the reference frame relative to the aircraft and then to transfer it into the terrestrial reference frame.

The first track and the second track are characterized by respective sets of equations as a function of time, thereby defining respective positions for the object and for the aircraft in the terrestrial reference frame. The set of equations characterizing the first track for the object in the terrestrial reference frame is determined from the successive first states for the object and from the successive second states for the aircraft, the successive first states characterizing the object relative to the aircraft and the successive second states characterizing the aircraft in absolute manner. The set of equations characterizing the second track for the aircraft in the terrestrial reference frame is determined solely from the successive second states characterizing the aircraft in absolute manner.

Each set of equations comprises three equations for defining three coordinates for the object and three coordinates for the aircraft in the terrestrial reference frame.

Once past and future movements have been estimated for the object and for the aircraft, it is then possible to characterize the distance between the first track for the object and the second track for the aircraft as a function of time. This distance between the first track and the second track may be estimated by a polynomial function defined from the two sets of equations.

The sets of equations characterizing the first and second tracks and the polynomial function characterizing the distance between the first and second tracks are defined by at least one calculation device. The calculation device may be dedicated to establishing these sets of equations, being in particular shared between estimating states for the object and states for the aircraft, or else they may already be present in the aircraft and shared with one or more other functions of the aircraft. The sets of equations and the polynomial function are thus defined from the first states for the object, i.e. its position, its speed, and its acceleration, and from the second states for the aircraft, i.e. its position, its speed, and its acceleration.

Furthermore, in order to simplify the sets of equations and also the polynomial function, and thereby limiting their complexity and making them to easier to solve, assumptions may be made in particular about the behavior of the object and/or the behavior of the aircraft. For example, by assuming that the object and the aircraft are moving with constant acceleration, the first track and the second track can be characterized by respective sets of three second order equations. Consequently, the distance between the first track for the object and the second track for the aircraft can be characterized by a polynomial function of degree four at most as defined from the two sets of three second order equations.

Thereafter, the risk of collision between the object and the aircraft is determined from the fourth estimate of a minimum distance between the first track for the object and the second track for the aircraft, and in particular between the future paths for the object and for the aircraft.

The fourth estimate of this minimum distance is the minimum value of the polynomial function. The fourth estimate of the minimum distance is made solely between the future paths for the object and for the aircraft.

The fourth estimate for the minimum distance between the first track and the second track may be made by an estimator calculating the minimum distance by differentiating, relative to time, the polynomial function characterizing the distance between the first track and the second track, and by searching for the time value that minimizes that distance. The estimator is preferably integrated in the above-mentioned calculation device that also makes the estimate of the states for the tracks for the object and for the aircraft.

With the assumption of constant acceleration for the object and for the aircraft, the polynomial function of time characterizing the distance between the first and second tracks is a polynomial function of degree four. Its derivative relative to time is thus a polynomial function of degree three. The minimum distance is obtained for a particular time value at which the derivative is zero. For the polynomial function of degree three, this derivative is zero at one or three particular values.

When only one particular time value makes this derivative zero, the minimum distance is thus defined by applying that particular time to the polynomial function characterizing the distance between the first and second tracks.

When this derivative is zero at three particular time values, each particular time value corresponds to a local extremum of the polynomial function of time. Among these three local extrema, only one local extremum constitutes the minimum distance between the first and second tracks.

The method of the invention then serves to identify a first level of risk of collision between the object and the aircraft.

Specifically, when the minimum distance associated with the determined particular time value is less than a first threshold, a warning is triggered. As a result, the pilot of the aircraft is warned that an object is approaching the aircraft and that it would be prudent to perform an avoidance maneuver quickly so that the aircraft moves away from the object, thereby eliminating the risk of collision. The pilot may be located in the aircraft or may be remote from the aircraft if it is an unmanned aircraft.

The warning is issued by a warning device. The warning may be visual, e.g. displaying a message or a specific symbol on a screen, and/or it may be a sound warning, e.g. by emitting one or more sounds or else a voice announcement that can be heard by the pilot. Under all circumstances, the warning must be sufficiently explicit to enable the pilot to identify the situation and perform the appropriate maneuver.

In a particular implementation of the invention, the method of the invention for avoiding an object by detecting its approach includes an additional step of the aircraft automatically performing an object avoidance maneuver as soon as the minimum distance is less than a second threshold, the second threshold being less than the first threshold.

Specifically, as soon as the minimum distance associated with the determined particular time value is less than the second threshold, a second level of risk has been reached for collision between the object and the aircraft and the aircraft performs an object avoidance maneuver automatically. Specifically, under such circumstances, the first track for the object is tending to approach the second track for the aircraft dangerously and it is necessary to engage an avoidance maneuver as quickly as possible. Under such circumstances, in order to avoid any risk of collision, the aircraft performs the avoidance maneuver automatically so as to move away from the detected object.

In an implementation appropriate for a rotary wing aircraft, the first threshold is equal to 1 nautical mile (NM), which is equal to 1852 meters (m), and the second threshold is equal to 0.5 NM.

Nevertheless, the detected object may be far away from the aircraft, in which case there is no need to trigger a warning or engage an avoidance maneuver immediately, even if the first track for the object and the second track for the aircraft are tending to approach each other. Specifically, firstly errors in estimating the first states for an object that is far away run the risk of being large, and secondly air traffic requirements impose common way points on all aircraft. The risk of collision between the object and the aircraft has therefore not been confirmed, and it is preferable to wait for the object to come closer to the aircraft in order to confirm whether the first track for the object is indeed approaching the second track for the aircraft or whether the two tracks are moving apart from each other.

Specifically, the method of the invention may include a step of inhibiting triggering the alarm or indeed of inhibiting automatic performance of an avoidance maneuver, so long as the current distance between the object and the aircraft is greater than a distance threshold, which current distance between the object and the aircraft is estimated by the detector device of the aircraft. By way of example, the distance threshold may be 2 NM.

In order to perform this avoidance maneuver, the method of the invention communicates with the autopilot included in the aircraft, e.g. giving it avoidance orders corresponding to the avoidance maneuver.

In addition, in this particular implementation of the invention, the method of the invention may define an avoidance maneuver so that the aircraft moves quickly away from the object by maximizing the distance between the first track for the object and the second track for the aircraft associated with the previously determined particular time value. Preferably, this avoidance maneuver is performed with a particular acceleration for the aircraft that serves to maximize this distance between the first track and the second track associated with the previously determined particular time values.

By way of example, this particular acceleration is estimated by applying a set of equations determining this distance between the first track for the detected object and the second track for the aircraft that serves to determine the instant when the distance will reach a minimum, i.e. the particular time value associated with this minimum distance, and then by calculating an acceleration vector for the aircraft that maximizes the minimum distance. Thereafter, it is appropriate to use the acceleration vector to predict a new second track for the aircraft and to verify that the minimum distance between the first track for the detected object and the new second track for the aircraft is greater than the first threshold in order to be sure that there is no risk of collision throughout the avoidance maneuver.

In most circumstances, this calculation suffices to obtain a new second track for the aircraft having a minimum distance relative to the first track for the detected object that is greater than the first threshold.

Nevertheless, under particular circumstances, specifically when in the proximity of relief or on simultaneously detecting a plurality of intruders such as a flock of birds, it is possible that this new second track for the aircraft does not enable a minimum distance to be obtained from the first track for a detected intruder that is greater than the first threshold.

Under such circumstances, if a risk of collision continues to exist, since the minimum distance between the first track and the new second track is less than the first threshold, it is necessary to perform at least one iteration of this acceleration vector calculation in order to obtain a minimum distance between the first track for a detected object and a new second track for the aircraft that is sufficient, i.e. greater than the first threshold. Given that the aircraft and each intruder progresses continuously along their respective tracks while this first calculation is being performed, it is then appropriate to determine a new minimum distance between the tracks, to calculate a new acceleration vector that maximizes the distance, and to determine a new second track for the aircraft using the new acceleration vector. Thereafter, after verifying that this new second track for the aircraft makes it possible to obtain a minimum distance from the first track for the detected object that is greater than the first threshold, the new second track is used by the aircraft or else a new iteration of this calculation is performed once more, when necessary.

In particular, the particular acceleration maximizing the distance between the first track for the object and the second track for the aircraft may be estimated by differentiating the minimum distance ($d_m$) relative to each of the components of the acceleration vector for the aircraft in order to determine the particular acceleration of the aircraft that maximizes this minimum distance ($d_m$).

Nevertheless, the avoidance maneuver is preferably performed by giving priority to the comfort of the crew and the passengers and also to operational aspects of the aircraft. By way of example, the term "operational aspects" is used to cover uncertainty about the position of the aircraft and about the position of relief in its vicinity. For this purpose, a limited acceleration is defined. Under such circumstances, if the above-defined particular acceleration is greater than the limited acceleration, the avoidance maneuver is performed using the limited acceleration. By way of example, this limited acceleration is equal to one-fourth of the acceleration due to terrestrial gravity.

Furthermore, this avoidance maneuver may include a change of heading enabling a coordinated turn to be performed.

As a result, the method of the invention makes it possible to anticipate a risk of collision between the aircraft and the object and guarantees automatic performance of an avoidance maneuver maximizing the minimum passing distance between the aircraft and the detected object, and to do so at the cost of an implementation that is simple and thus easy to perform in a flight computer of an aircraft.

In order to define this avoidance manoeuvre, it is possible initially, in a navigation reference frame (N,E,D) that is assumed to be inertial, to define the positions $$\begin{pmatrix} N_I(0) \\ E_I(0) \\ D_I(0) \end{pmatrix},$$

speeds $$\begin{pmatrix} \dot{N}_I(0) \\ \dot{E}_I(0) \\ \dot{D}_I(0) \end{pmatrix}$$

and accelerations $$\begin{pmatrix} \ddot{N}_I(0) \\ \ddot{E}_I(0) \\ \ddot{D}_I(0) \end{pmatrix}$$

of an object that might constitute an intruder as detected at an initial instant (0) considered as being the origin for time. The position of this object in the navigation reference frame (N,E,D) at a future time t can be predicted by assuming that its accelerations are constant, such that:

$$\begin{cases} N_I(t) = N_I(0) + \dot{N}_I(0)t + \frac{1}{2}\ddot{N}_I(0)t^2 \\ E_I(t) = E_I(0) + \dot{E}_I(0)t + \frac{1}{2}\ddot{E}_I(0)t^2 \\ D_I(t) = D_I(0) + \dot{D}_I(0)t + \frac{1}{2}\ddot{D}_I(0)t^2 \end{cases}$$

Likewise, knowing, in the same navigation reference frame (N,E,D), the positions $$\begin{pmatrix} N_A(0) \\ E_A(0) \\ D_A(0) \end{pmatrix},$$

speeds $$\begin{pmatrix} \dot{N}_A(0) \\ \dot{E}_A(0) \\ \dot{D}_A(0) \end{pmatrix}$$

and accelerations $$\begin{pmatrix} \ddot{N}_A(0) \\ \ddot{E}_A(0) \\ \ddot{D}_A(0) \end{pmatrix}$$

of the aircraft at the initial instant (0), its position at the future time t can also be predicted by assuming that its accelerations are constant, such that:

$$\begin{cases} N_A(t) = N_A(0) + \dot{N}_A(0)t + \frac{1}{2}\ddot{N}_A(0)t^2 \\ E_A(t) = E_A(0) + \dot{E}_A(0)t + \frac{1}{2}\ddot{E}_A(0)t^2 \\ D_A(t) = D_A(0) + \dot{D}_A(0)t + \frac{1}{2}\ddot{D}_A(0)t^2 \end{cases}$$

The square of the distance D between the tracks of the aircraft and of the intruder is a function of time t such that:

$\mathrm{Dsqr}(t) = \{[N_I(0) - N_A(0)] + [\dot{N}_I(0) - \dot{N}_A(0)]t + \frac{1}{2}[\ddot{N}_I(0) - \ddot{N}_A(0)]t^2\}^2 + \{[E_I(0) - E_A(0)] + [\dot{E}_I(0) - \dot{E}_A(0)]t + \frac{1}{2}[\ddot{E}_I(0) - \ddot{E}_A(0)]t^2\}^2 + \{[D_I(0) - D_A(0)] + [\dot{D}_I(0) - \dot{D}_A(0)]t + \frac{1}{2}[\ddot{D}_I(0) - \ddot{D}_A(0)]t^2\}^2.$ The square of the distance D can also be written:

$\mathrm{Dsqr}(t) = \{a_X + b_X t + c_X t^2\}^2 + \{a_Y + b_Y t + c_Y t^2\}^2 + \{a_Z + b_Z t + c_Z t^2\}^2$ where:

$$\begin{cases} a_X = N_I(0) - N_A(0) \\ b_X = \dot{N}_I(0) - \dot{N}_A(0) \\ c_X = \frac{1}{2}[\ddot{N}_I(0) - \ddot{N}_A(0)] \end{cases},$$

$$\begin{cases} a_Y = E_I(0) - E_A(0) \\ b_Y = \dot{E}_I(0) - \dot{E}_A(0) \\ c_Y = \frac{1}{2}[\ddot{E}_I(0) - \ddot{E}_A(0)] \end{cases} \text{ and}$$

$$\begin{cases} a_Z = D_I(0) - D_A(0) \\ b_Z = \dot{D}_I(0) - \dot{D}_A(0) \\ c_Z = \frac{1}{2}[\ddot{D}_I(0) - \ddot{D}_A(0)] \end{cases}.$$

If any one of the coefficients $c_X$, $c_Y$, or $c_Z$ is not zero, then this function Dsqr(t) is a fourth degree polynomial of time t in which the $t^4$ term is $(c_X^2 + c_Y^2 + c_Z^2)$. This function Dsqr(t) thus tends to increase indefinitely with time t.

If all of the coefficients $c_X$, $c_Y$, and $c_Z$ are zero and if any one of the coefficients $b_X$, $b_Y$, or $b_Z$ is not zero, this function Dsqr(t) is a second degree polynomial of time t in which the $t^2$ term is $(b_X^2 + b_Y^2 + b_Z^2)$. This function Dsqr(t) thus tends to increase indefinitely with time t.

Finally, if all of the coefficients $b_X$, $b_Y$, $b_Z$, $c_X$, $c_Y$, and $c_Z$ are zero, then the function Dsqr(t) is constant and the object is not a threat to the aircraft.

When the function Dsqr(t) is a fourth degree polynomial of time, its derivative $$\frac{\partial \mathrm{Dsqr}(t)}{\partial t}$$

relative to time t is a third degree polynomial. Such a third degree polynomial can have three complex roots, with those that contain a nonzero imaginary term necessarily being conjugate, since the coefficients of this polynomial are real. Such a third degree polynomial thus has either one real root and two conjugate complex roots, or else three real roots. The term "root" of a polynomial is used to mean a value or solution that enables the polynomial to have the value zero.

When the function Dsqr(t) is a second degree polynomial of time, its derivative $$\frac{\partial \mathrm{Dsqr}(t)}{\partial t}$$

relative to time t is a first degree polynomial that can have only one root.

In both of these situations, the function Dsqr(t) takes on positive infinite values when time t tends towards infinity in positive or negative manner (±∞). Under such circumstances, if its derivative $$\frac{\partial \mathrm{Dsqr}(t)}{\partial t}$$

relative to time t can have only one root, then that root corresponds to a minimum of the function Dsqr(t).

If the derivative $$\frac{\partial \mathrm{Dsqr}(t)}{\partial t}$$

can have three real roots, then three situations can arise.

Firstly, if these three roots are distinct, then the derivative $$\frac{\partial \mathrm{Dsqr}(t)}{\partial t}$$

is or negative sign when time t tends towards negative infinity (−∞). With increasing time t, this derivative $$\frac{\partial \mathrm{Dsqr}(t)}{\partial t}$$

becomes zero at each root, and then changes sign at each of those roots to end up with a positive sign after the third root. Specifically, the first and third roots necessarily constitute minima of the function Dsqr(t).

Thereafter, if two roots are double, i.e. if they coincide, and are different from the single root, then the derivative $$\frac{\partial \mathrm{Dsqr}(t)}{\partial t}$$

is zero at the double root without changing sign. It therefore changes sign only at the single root, which is the only minimum of the function Dsqr(t).

Finally, if these three roots are triple and coincide, then the derivative $$\frac{\partial Dsqr(t)}{\partial t}$$

is zero and changes sign at this triple root, which then constitutes a minimum of the function Dsqr(t).

Regardless of whether the third order equation is solved directly, e.g. by Cardano's method, or else by numerical approximation, e.g. using the method of Jenkins and Traub, it is always possible to determine one or two minimum passing distances as a function of time t. Since it is appropriate to pay attention only to minimum distances in the future, i.e. corresponding to positive time t, it can be seen from this short analysis that three situations are possible.

In a first situation, each root for which the derivative $$\frac{\partial Dsqr(t)}{\partial t}$$

is zero, is itself negative, then the square of the distance Dsqr(t) only increases after the initial instant, so no correction of the track of the aircraft is needed.

In a second situation, one of the roots written $t_{min}$ at which the derivative $$\frac{\partial Dsqr(t)}{\partial t}$$

is zero, is itself positive. The square of the distance Dsqr(t) therefore passes through a minimum at the time $t_{min}$. A correction of the track will then be needed, if the minimum distance at time $t_{min}$ is less than the second threshold.

In a third situation, two roots written $t_{min1}$ and $t_{min2}$ that cause the derivative $$\frac{\partial Dsqr(t)}{\partial t}$$

to be zero, are themselves positive. The square of the distance Dsqr(t) then passes through two minima, at the times $t_{min1}$ and $t_{min2}$. A track correction will likewise be needed if at least one of these two minimum distances at the times $t_{min1}$ and $t_{min2}$ is less than the second threshold.

At a time written generically $t_{min}$ and corresponding to a minimum of the square of the distance Dsqr(t), and thus to a minimum distance between the first track for the object and the second track for the aircraft, the square of this minimum distance is written:

$$Dsqr(t_{min}) = \{a_X + b_X t_{min} + c_X t_{min}^2\}^2 + \{a_Y + b_Y t_{min} + c_Y t_{min}^2\}^2 + \{a_Z + b_Z t_{min} + c_Z t_{min}^2\}^2.$$

It is possible to act on the coefficients $c_X$, $c_Y$, and $c_Z$ by controlling the accelerations $[\ddot{N}_A(0), \ddot{E}_A(0), \ddot{D}_A(0)]$ of the aircraft, since $$\begin{cases} c_X = \frac{1}{2}[\ddot{N}_I(0) - \ddot{N}_A(0)] \\ c_Y = \frac{1}{2}[\ddot{E}_I(0) - \ddot{E}_A(0)] \\ c_Z = \frac{1}{2}[\ddot{D}_I(0) - \ddot{D}_A(0)] \end{cases}.$$

It is therefore possible to evaluate the influence on the square of this minimum distance $Dsqr(t_{min})$ of a variation in acceleration around its initial value $[\ddot{N}_A(0)+\delta\ddot{N}_A, \ddot{E}_A(0)+\delta\ddot{E}_A, \ddot{D}_A(0)+\delta\ddot{D}_A]$ as performed in a time that is sufficiently short on the scale of the complete manoeuvre. Specifically, the partial derivatives of the square of this minimum distance $Dsqr(t_{min})$ relative to each of the terms of this acceleration of the aircraft give the directions in which it is appropriate to correct the track of the aircraft in order to increase the minimum distance. The square of the minimum distance $Dsqr_{t_{min}}(\ddot{N}_A, \ddot{E}_A, \ddot{D}_A)$, as a function of the acceleration of the aircraft, can be approximated to the first order as follows:

$$Dsqr_{t_{min}}(\ddot{N}_A, \ddot{E}_A, \ddot{D}_A) \approx Dsqr_{t_{min}}(\ddot{N}_A(0), \ddot{E}_A(0), \ddot{D}_A(0)) + \frac{\partial Dsqr_{t_{min}}(\ddot{N}_A(0), \ddot{E}_A(0), \ddot{D}_A(0))}{\partial \ddot{N}_A}\delta\ddot{N}_A +$$

$$\frac{\partial Dsqr_{t_{min}}(\ddot{N}_A(0), \ddot{E}_A(0), \ddot{D}_A(0))}{\partial \ddot{E}_A}\delta\ddot{E}_A +$$

$$\frac{\partial Dsqr_{t_{min}}(\ddot{N}_A(0), \ddot{E}_A(0), \ddot{D}_A(0))}{\partial \ddot{D}_A}\delta\ddot{D}_A.$$

These directions are thus brought together in the following normalized vector:

$$\vec{u}_{A_{Nav}} = \frac{1}{\sqrt{\left[\frac{\partial Dsqr_{t_{min}}(\ldots)}{\partial \ddot{N}_A}\right]^2 + \left[\frac{\partial Dsqr_{t_{min}}(\ldots)}{\partial \ddot{E}_A}\right]^2 + \left[\frac{\partial Dsqr_{t_{min}}(\ldots)}{\partial \ddot{D}_A}\right]^2}} \begin{pmatrix} \frac{\partial Dsqr_{t_{min}}(\ldots)}{\partial \ddot{N}_A} \\ \frac{\partial Dsqr_{t_{min}}(\ldots)}{\partial \ddot{E}_A} \\ \frac{\partial Dsqr_{t_{min}}(\ldots)}{\partial \ddot{D}_A} \end{pmatrix} = \begin{pmatrix} \delta n_A \\ \delta e_A \\ \delta d_A \end{pmatrix}$$

Any manoeuvre creating an acceleration correction $$\begin{pmatrix} \delta n \\ \delta e \\ \delta d \end{pmatrix}$$

such that $\delta n_A \cdot \delta n + \delta e_A \cdot \delta e + \delta d_A \cdot \delta d > 0$ therefore increases the minimum distance and contributes to avoidance, with this vector $$\begin{pmatrix} \delta n \\ \delta e \\ \delta d \end{pmatrix}$$

being aligned on $$\begin{pmatrix} \delta n_A \\ \delta e_A \\ \delta d_A \end{pmatrix},$$

i.e.

$$\begin{pmatrix} \delta n \\ \delta e \\ \delta d \end{pmatrix} = \gamma \begin{pmatrix} \delta n_A \\ \delta e_A \\ \delta d_A \end{pmatrix}$$

with γ>0, serving to maximize this avoidance, i.e. to obtain the greatest possible increase in the minimum distance for a given modulus of the acceleration correction. Seeking avoidance thus amounts to correcting the "acceleration" vector, in three-dimensional space, so that it points in the same direction as the unit vector $\vec{u}_{A_{Nav}}$.

Furthermore, an aircraft has acceleration capabilities that are limited in amplitude, in duration, and in direction. In addition, these constraints are stronger when there are occupants on board, since it is necessary to preserve their comfort or indeed to inform the pilot of the aircraft about the elements that are needed for understanding the avoidance manoeuvre that is to be performed.

In general, such an avoidance manoeuvre is to be performed during cruising flight of the aircraft, which then has acceleration that is substantially zero. Thus by making this assumption of the acceleration of the aircraft being zero, the vector $$\vec{u}_{A_{Nav}} = \begin{pmatrix} n_A \\ e_A \\ d_A \end{pmatrix}$$

can be split into a target horizontal acceleration and a target vertical acceleration.

Since the vector $\vec{u}_{A_{Nav}}$ is a unit vector, it can be rewritten by using firstly an angle β between the axis N of the navigation reference frame and the projection of the vector $\vec{u}_{A_{Nav}}$ onto the plane (N,E), which is selected because it is generally horizontal, being taken to be positive in the clockwise direction when seen from above, and secondly an angle α between the plane (N,E) and the vector $\vec{u}_{A_{Nav}}$, taken to be positive upwards.

The angle β is obtained by calculating the two-argument arc-tangent of the components $e_A$ and $n_A$ of the vector $\vec{u}_{A_{Nav}}$, i.e. $\beta = a\tan 2(e_A, n_A)$, providing these two components are not simultaneously zero. If these two components are zero, then the angle β does not matter and the acceleration of the aircraft should, for example, be purely in alignment with the axis D of the navigation reference frame.

The angle α is obtained by calculating the opposite of the arc-sine of the component $d_A$ of the vector $\vec{u}_{A_{Nav}}$, this component $d_A$ being defined as positive downwards, i.e. $\alpha = -\arcsin(d_A)$. The angle α, expressed in radians, then lies in the range $$-\frac{\pi}{2} \text{ to } +\frac{\pi}{2}.$$

The unit vector is written as follows:

$$\vec{u}_{A_{Nav}} = \begin{pmatrix} n_A \\ e_A \\ d_A \end{pmatrix} = \begin{pmatrix} \cos\beta\cos\alpha \\ \sin\beta\cos\alpha \\ -\sin\alpha \end{pmatrix}.$$

The target acceleration $$\gamma \begin{pmatrix} \cos\beta\cos\alpha \\ \sin\beta\cos\alpha \\ -\sin\alpha \end{pmatrix}$$

as expressed in this way in the navigation reference frame can initially be transferred into a first reference frame (X,Y,D) attached to the aircraft by applying a rotation through an angle −ψ representing the opposite of the heading of the aircraft. The first reference frame (X,Y,D) attached to the aircraft is defined by an axis X situated in a horizontal plane, i.e. parallel to the plane (N,E), in alignment with the heading of the aircraft and pointing towards the front of the aircraft, an axis Y situated in the same horizontal plane and pointing towards the right of the aircraft, and the direction D of the navigation reference frame. The axis X of the first reference frame (X,Y,D) attached to the aircraft forms an angle with the direction N of the navigation reference frame constituting the heading ψ of the aircraft.

The target acceleration vector is then written in the first reference frame (X,Y,D) attached to the aircraft as follows:

$$\begin{pmatrix} a_X \\ a_Y \\ a_D \end{pmatrix} = \gamma \begin{pmatrix} \cos\psi & \sin\psi & 0 \\ -\sin\psi & \cos\psi & 0 \\ 0 & 0 & 1 \end{pmatrix} \begin{pmatrix} \cos\beta\cos\alpha \\ \sin\beta\cos\alpha \\ -\sin\alpha \end{pmatrix} = \gamma \begin{pmatrix} \cos(\beta-\psi)\cos\alpha \\ \sin(\beta-\psi)\cos\alpha \\ -\sin\alpha \end{pmatrix}.$$

This first rotation shows clearly that the avoidance strategy will necessarily be very different depending on the value of the angle difference (β−ψ).

The acceleration target vector is then transferred into a right-handed second reference frame (x,Y,W) attached to the aircraft by rotating through an angle representing the attitude angle about the pitching axis of the aircraft, i.e. its transverse direction. This right-handed second reference frame (x,Y,W) is defined by an axis x aligned on the longitudinal direction of the aircraft and pointing to the front of the aircraft, the axis Y, and an axis W, which is an intermediate calculation direction defined so that the (x,Y,W) trihedron forms a right-handed reference frame.

The target acceleration vector is then written in the second reference frame (x,Y,W) attached to the aircraft as follows:

$$\begin{pmatrix} a_x \\ a_Y \\ a_W \end{pmatrix} = \gamma \begin{pmatrix} \cos\theta & 0 & -\sin\theta \\ 0 & 1 & 0 \\ \sin\theta & 0 & \cos\theta \end{pmatrix} \begin{pmatrix} \cos(\beta-\psi)\cos\alpha \\ \sin(\beta-\psi)\cos\alpha \\ -\sin\alpha \end{pmatrix}$$

$$= \gamma \begin{pmatrix} \cos(\beta-\psi)\cos\alpha\cos\theta + \sin\alpha\sin\theta \\ \sin(\beta-\psi)\cos\alpha \\ \cos(\beta-\psi)\cos\alpha\sin\theta - \sin\alpha\cos\theta \end{pmatrix}.$$

As a result, for values of the angle difference ($\beta-\psi$) such that $\cos(\beta-\psi)$ tends towards one, the target acceleration vector tends towards $$\gamma \begin{pmatrix} \cos(\theta-\alpha) \\ 0 \\ \sin(\theta-\alpha) \end{pmatrix},$$

for values of the angle difference ($\beta-\psi$) such that $\cos(\beta-\psi)$ tends towards ($-1$), the target acceleration vector tends towards $$\gamma \begin{pmatrix} \cos(\theta+\alpha) \\ 0 \\ -\sin(\theta+\alpha) \end{pmatrix},$$

and for values of the angle difference ($\beta-\psi$) such that $\cos(\beta-\psi)$ tends towards 0, the target acceleration vector tends towards $$\gamma \begin{pmatrix} \sin\alpha\sin\theta \\ \pm\cos\alpha \\ -\sin\alpha\cos\theta \end{pmatrix}.$$

Also, the acceleration vector of the aircraft may be expressed in a local reference frame (x,y,z) attached to the aircraft, the axis x being the longitudinal direction of the aircraft pointing towards the front, the axis y being the transverse direction of the aircraft and pointing towards the right, and the axis z being the vertical direction at the aircraft and pointing downwards. The acceleration vector of the aircraft may be written in this local reference frame (x,y,z):

$$\begin{pmatrix} a_x \\ a_y \\ a_z \end{pmatrix} = G \begin{pmatrix} j_x - \sin\theta \\ j_y + \cos\theta\sin\varphi \\ j_z + \cos\theta\cos\varphi \end{pmatrix},$$

where G is the acceleration due to terrestrial gravity and $$\begin{pmatrix} j_x \\ j_y \\ j_z \end{pmatrix}$$

are the load factors measured by the accelerometers of the aircraft. A transfer between the local reference frame (x,y,z) and the second reference frame (x,Y,W) is performed by rotation through an angle $\varphi$ corresponding to the attitude angle about the roll axis of the aircraft, i.e. its longitudinal direction, such that the acceleration vector of the aircraft is written as follows in the second reference frame (x,Y,W):

$$G \begin{pmatrix} 1 & 0 & 0 \\ 0 & \cos\varphi & -\sin\varphi \\ 0 & \sin\varphi & \cos\varphi \end{pmatrix} \begin{pmatrix} j_x - \sin\theta \\ j_y + \cos\theta\sin\varphi \\ j_z + \cos\theta\cos\varphi \end{pmatrix} = G \begin{pmatrix} j_x - \sin\theta \\ j_y\cos\varphi - j_z\sin\varphi \\ j_y\sin\varphi + j_z\cos\varphi + \cos\theta \end{pmatrix}.$$

For reasons of occupant comfort, it is generally selected to keep the lateral load factor $j_y$ as close as possible to 0 in forward flight. On this assumption, the acceleration of the aircraft in the second reference frame reduces to $$G \begin{pmatrix} j_x - \sin\theta \\ -j_z\sin\varphi \\ j_z\cos\varphi + \cos\theta \end{pmatrix}.$$

Furthermore, while the aircraft is turning and for occupant comfort, it is also selected to keep $$\tan\varphi = \frac{U}{G}\dot{\psi},$$

with U being the longitudinal speed of the aircraft, i.e any banking of the aircraft must be accompanied by substantially proportional turning of the heading of the aircraft.

In addition, and unlike an airplane or indeed an aircraft having one or more propulsion propellers capable of acting significantly on the longitudinal load factor $j_x$ by thrust from propulsion engines or propellers, a traditional rotary wing aircraft moves with a longitudinal load factor $j_x$ that is small while performing ordinary manoeuvres. The main part of the longitudinal acceleration of the aircraft, normalized as a function of the acceleration due to terrestrial gravity G, written $\delta_{long}$, and measured as being positive in the forward direction, thus comes from tilting the weight of the aircraft such that $G(j_x-\sin\theta)\approx G\cdot\delta_{long}$, with the pure longitudinal thrust obtained by tilting of the rotor disk of the aircraft contributing very little to this value.

Thereafter, the vertical load factor $j_z$ needs to be controlled so as to compensate for substantially all of the weight of the aircraft and enable a minimum vertical acceleration to be created that, when normalized as a function of the acceleration due to terrestrial gravity G, is written $\delta_{vert}$ and is measured as being positive upwards, including while banking in a turn, such that $$j_z = -\frac{\cos\theta + \delta_{vert}}{\cos\varphi}.$$

A term $\cos\theta$ that is very close to 1 during most flying circumstances can nevertheless be taken into account in this calculation of the vertical load factor $j_z$.

Under such circumstances, it is then appropriate to find out how to satisfy a target defined by the acceleration vector $$\gamma \begin{pmatrix} \cos(\beta-\psi)\cos\alpha\cos\theta + \sin\alpha\sin\theta \\ \sin(\beta-\psi)\cos\alpha \\ \cos(\beta-\psi)\cos\alpha\sin\theta - \sin\alpha\cos\theta \end{pmatrix}$$

while being able to act only on the terms of the vector $$G \begin{pmatrix} j_x - \sin\theta \\ -j_z\sin\varphi \\ j_z\cos\varphi + \cos\theta \end{pmatrix},$$

i.e. the attitudes ($\varphi$ and $\theta$) and the load factor $j_z$, typically by taking on an angle of incidence or acting on the collective pitch, and the change $\dot\psi$ in the heading caused by taking on a roll angle. One possible control strategy for performing the avoidance manoeuvre may then be as follows:

perform roll action in order to obtain:

$$\varphi = \tan^{-1}\left[\frac{\gamma}{G}\sin(\beta-\psi)\cos\alpha\right];$$

coordinate this roll action with variation $\dot\psi$ of the heading so as to ensure $$\frac{G}{U}\tan\varphi = \dot\psi;$$

and
coordinate this roll action with action on the collective pitch so as to ensure that $$j_z = -\frac{\cos\theta + \delta_{vert}}{\cos\varphi} \approx -\frac{1}{\cos\varphi}.$$

This gives rise to:

$$-G \cdot j_z\sin\varphi = G\tan\varphi = G\frac{\gamma}{G}\sin(\beta-\psi)\cos\alpha = \gamma\cdot\sin(\beta-\psi)\cos\alpha.$$

It is also possible to indicate that the roll relationship $$\varphi = \tan^{-1}\left[\frac{\gamma}{G}\sin(\beta-\psi)\cos\alpha\right]$$

must nevertheless comply with constraints concerning maximum roll angle, e.g. ±30°, or ±45°, or indeed maximum values that are a function of the longitudinal speed U e.g. ±0.584 times the speed U expressed in meters per second (m/s) less than ±30°, or ±45°.

It may also be indicated that coordinating the turn leads to the equation $$\frac{\gamma}{U}\sin(\beta-\psi)\cos\alpha = \dot\psi,$$

which converges on aligning the heading $\psi$ on the horizontal direction defined by the angle $\beta$. This roll stage of causing roll can therefore be transient only.

This "lateral" strategy must therefore be associated with a strategy seeking to satisfy the other two acceleration targets:

$$\begin{cases} \gamma[\cos(\beta-\psi)\cos\alpha\cos\theta + \sin\alpha\sin\theta] = G(j_x - \sin\theta) = G\cdot\delta_{long} \\ \gamma[\cos(\beta-\psi)\cos\alpha\sin\theta - \sin\alpha\cos\theta] = G(j_z\cos\varphi + \cos\theta) = -G\cdot\delta_{vert} \end{cases}$$

Document FR 2 830 630 describes how to make use of such a vertical target on a traditional rotary wing aircraft (given herein by $-\gamma[\cos(\beta-\psi)\cos\alpha\sin\theta-\sin\alpha\cos\theta]$) and such a longitudinal target (given herein by $\gamma[\cos(\beta-\psi)\cos\alpha\cos\theta+\sin\alpha\sin\theta]$), while complying with constraints on maximum power and minimum airspeed.

Also, the same control distribution could be applied in this example, thereby adding to the strategy for controlling avoidance. However, at high speed, the object avoidance strategy gives precedence to a vertical target, which might therefore be achieved to the detriment of a longitudinal target.

Also, the method of the invention may include an additional step of displaying the object on a display device. As a result, the pilot of the aircraft can visualize the position of the object relative to the aircraft and how it is progressing on the display device, thereby making it easier for the crew of the aircraft to identify it directly outside the aircraft. The display device may be a screen present in the aircraft, a man machine interface (MMI) device, a head-up display device, or indeed a display system incorporated in the helmet of the aircraft pilot.

The invention also provides an avoidance device for avoiding an object by detecting its approach and for fitting to an aircraft, the device comprising:

a detector device for detecting the object and supplying a first state for the object;

a positioning device for positioning the aircraft and providing a second state for the aircraft;

at least one memory storing calculation instructions, successive first states for the object, and successive second states for the aircraft;

at least one calculation device suitable for executing the calculation and for performing the above-described method; and at least one warning device connected to the calculation device.

This device for avoiding an object by detecting its approach then enables the above-described method to be performed.

The avoidance device is also connected to the autopilot of the aircraft in order to cause the avoidance manoeuvre to be performed when conditions require that.

The invention also provides an aircraft including in particular an autopilot and an avoidance device as described above for avoiding an object by detecting its approach.

BRIEF DESCRIPTION OF THE DRAWINGS

The invention and its advantages appear in greater detail from the following description of implementations given by way of illustration and with reference to the accompanying figures, in which:

FIG. 1 shows a rotary wing aircraft having a device for avoiding an object by detecting its approach;

FIG. 2 is a flow chart of a method of avoiding an object by detecting its approach; and FIG. 3 is a view of an aircraft, of objects in its vicinity, and of their tracks.

Elements present in more than one of the figures are given the same references in each of them.

DETAILED DESCRIPTION OF THE INVENTION

FIG. 1 shows a rotary wing aircraft 20 comprising in particular a fuselage 21, a main rotor 22 providing it with lift and possibly also with propulsion, and a tail rotor 23. The aircraft 20 also has an autopilot 24, a device 50 for avoiding an object 10 by detecting its approach, and an instrument panel 25 having a screen 56.

The device 50 has a detector device 51 for detecting an object 10 situated in the vicinity of the aircraft 20, and providing a first state for the object 10, a positioning device 52 of the aircraft 20 providing a second state for the aircraft 20, at least one memory 53 storing calculation instructions, successive first states for the object 10, and successive second states for the aircraft 20, at least one calculation device 54 suitable for executing the calculation instructions, and at least one warning device 55.

Specifically, aircraft, and in particular rotary wing aircraft, can fly in flight zones that are not controlled and in which the risk of collision with a flying object 10 is significant. Such a moving object 10 may for example be another aircraft, a drone, or even a bird, and is considered as an intruder in the vicinity of the aircraft 20.

The risk of collision with a stationary object 10, formed by the terrain in the vicinity of the aircraft 20 or indeed an obstacle on that terrain, also exists when the aircraft 20 is flying at very low altitude.

The device 50 seeks to limit, or even to eliminate, this risk of collision by performing a method of avoiding an object 10 by detecting its approach as outlined by the various steps shown in FIG. 2.

FIG. 3 shows the aircraft 20 and its vicinity in which there are two moving objects 10 and 10'. Two reference planes are also shown in FIG. 3. A local reference frame $(X_L, Y_L, Z_L)$ attached to the aircraft 20 is constituted by three mutually orthogonal directions $X_L$, $Y_L$, and $Z_L$ that are stationary relative to the aircraft 20. A terrestrial reference frame $(X_T, Y_T, Z_T)$ is formed for example by the north direction, the east direction, and a downwardly-directed vertical direction corresponding to the terrestrial gravity direction.

The method of avoiding an object 10 by detecting its approach to an aircraft 20 begins with detecting 101 an object 10 approaching the aircraft 20. This detection of an object 10 approaching the aircraft 20 is performed by the detector device 51. By way of example, the detector device 51 is formed by an electromagnetic wave detector system, an optical detector system, or indeed an imaging system including at least one camera. The detector device 51 is capable of detecting a stationary or moving object 10, 10' situated in the vicinity of the aircraft 20 and is also capable of estimating first successive states for the object 10, 10', namely its position, its speed, and its acceleration.

Under such circumstances, the detector device 51 can thus use the first successive states for the object 10, 10' to estimate whether it is approaching the aircraft 20 or on the contrary going away therefrom.

In the example shown in FIG. 3, it can be seen a first object 10 that has a first track 16 approaching the aircraft 20 and the second track 26 of the aircraft 20, and a second object 10' that has a first track 16' going away from the aircraft 20 and its second track 26. Under such circumstances, the avoidance method ignores the second object 10' during the following step since it does not present any risk of collision with the aircraft 20, and the method concentrates on the first object 10, which might present a risk of collision with the aircraft 20.

Thereafter, the detector device 51 makes first estimates 102 of successive first states for the object 10. The position, the speed, and the acceleration of the object 10, which constitute these first states, are defined in the local reference frame $(X_L, Y_L, Z_L)$ of the aircraft 20, i.e. relative to the aircraft 20. These successive first states for the object 10 may be stored temporarily in the memory 53.

Thereafter, a positioning device 52 makes second estimates 103 of successive states for the aircraft 20. As for the object 10, the second states for the aircraft 20 are formed by the position, the speed, and the acceleration of the aircraft 20. The position, the speed, and the acceleration of the aircraft 20 are estimated in the terrestrial reference frame $(X_T, Y_T, Z_T)$. These successive second states for the aircraft 20 can be stored temporarily in the memory 53. By way of example, the positioning device 52 is formed by at least one GNSS receiver, at least one inertial unit, or indeed a combination of a plurality of such pieces of equipment in order to improve accuracy and reliability.

After these successive first and second states have been estimated 102, 103, a first characterization 104 is performed of a first track 16 for the object 10. This first track 16 for the object 10 is established in the terrestrial reference frame $(X_T, Y_T, Z_T)$ by the calculation device 54 on the basis of the successive first states for the object 10 and on the basis of the successive second states for the aircraft 20 as stored in the memory 53.

In parallel, a second characterization 105 of a second track 26 for the aircraft 20 is also performed. This second track 26 of the aircraft 20 is likewise established in the terrestrial reference frame $(X_T, Y_T, Z_T)$ by the calculation device 54 on the basis of the successive second states for the aircraft 20 stored in the memory 53. This second characterization 105 of a second track 26 for the aircraft 20 may equally well be performed sequentially, after performing the first characterization 104 of a first track 16 for the object 10.

The first track 16 for the object 10 and the second track 26 for the aircraft 20 are characterized by respective sets of three equations as a function of time giving the respective positions of the object 10 and of the aircraft 20 in the terrestrial reference frame $(X_T, Y_T, Z_T)$.

These equations can be simplified, e.g. by assuming that the object 10 and the aircraft 20 have acceleration that is constant. These equations are then of second order. The following is thus obtained for the first track 16 for the object 10:

$$\begin{cases} X_0 = \hat{X}_{0i} + \hat{V}_{x0i}t + \frac{1}{2}\hat{G}_{x0i}t^2, \\ Y_0 = \hat{Y}_{0i} + \hat{V}_{y0i}t + \frac{1}{2}\hat{G}_{y0i}t^2, \\ Z_0 = \hat{Z}_{0i} + \hat{V}_{z0i}t + \frac{1}{2}\hat{G}_{z0i}t^2. \end{cases}$$

where:

$X_0$, $Y_0$, $Z_0$, are the coordinates of the object 10 in the terrestrial reference frame $(X_T, Y_T, Z_T)$, the coefficients of these equations being determined from the estimates of the successive first states for the object 10 and successive second states for the aircraft 20;

$\hat{X}_{0i}$, $\hat{Y}_{0i}$, $\hat{Z}_{0i}$, correspond to the initial coordinates of the object 10 in the terrestrial reference frame $(X_T, Y_T, Z_T)$;

$\hat{V}_{x0i}$, $\hat{V}_{y0i}$, $\hat{V}_{z0i}$, correspond to the initial speeds of the object 10 in the directions of the terrestrial reference frame $(X_T, Y_T, Z_T)$; and $\hat{G}_{x0i}$, $\hat{G}_{y0i}$, $\hat{G}_{z0i}$, are the accelerations of the object 10 in the directions of the terrestrial reference frame $(X_T, Y_T, Z_T)$.

Likewise, the following are obtained for the second track 26 for the aircraft 20:

$$\begin{cases} X_H = X_{Hi} + V_{xHi}t + \frac{1}{2}G_{xHi}t^2, \\ Y_H = Y_{Hi} + V_{yHi}t + \frac{1}{2}G_{yHi}t^2, \\ Z_H = Z_{Hi} + V_{zHi}t + \frac{1}{2}G_{zHi}t^2. \end{cases}$$

where:

$X_H$, $Y_H$, $Z_H$, are the coordinates of the aircraft 20 in the terrestrial reference frame $(X_T,Y_T,Z_T)$, the coefficients of these equations being determined from the estimates of the second successive states for the aircraft 20;

$X_{Hi}$, $Y_{Hi}$, $Z_{Hi}$, correspond to the initial coordinates of the aircraft 20 in the terrestrial reference frame $(X_T,Y_T,Z_T)$;

$V_{xHi}$, $V_{yHi}$, $V_{zHi}$, correspond to the initial speeds of the aircraft along the directions of the terrestrial reference frame $(X_T,Y_T,Z_T)$; and $G_{xHi}$, $G_{yHi}$, $G_{zHi}$, are the accelerations of the aircraft 20 in the directions of the terrestrial reference frame $(X_T,Y_T,Z_T)$.

A first estimate 106 is then made of a distance between the first track 16 for the object 10 and the second track 26 for the aircraft 20. This distance between the first track 16 and the second track 26 is defined from the two sets of three equations characterizing the first and second tracks 16 and 26 by means of a polynomial function of time such as:

$$D^2 = (X_0 + X_H)^2 + (Y_0 + Y_H)^2 + (Z_0 + Z_H)^2.$$

The assumption that acceleration of the object 10 and of the aircraft 20 are constant, this polynomial function of time is of the fourth degree, such that:

$$D^2 = (X_0 + X_H)^2 + (Y_0 + Y_H)^2 + (Z_0 + Z_H)^2 = f(t^4, t^3, t^2, t).$$

These sets of equations and the polynomial function of time can be stored temporarily in the memory 53.

A fourth estimate 107 of a minimum distance $d_m$ between the first track 16 for the object 10 and a second track 26 for the aircraft 20 is then made in order to identify a potential risk of collision between the object 10 and the aircraft 20. This minimum distance $d_m$ corresponds to a particular time value at which the time derivative of the polynomial function of time defining the distance between the first and second tracks 16 and 26 is zero.

Assuming constant acceleration for the object 10 and for the aircraft 20, this derivative relative to time is a polynomial function of third degree. Under such circumstances, there may exist either one or three particular time values at which this derivative formed by the polynomial function of third degree has the value zero, depending on the characteristics of the derivative. Nevertheless, in general, only one particular time value corresponds to a minimum distance $d_m$ between the first and second tracks 16, 26. This minimum distance $d_m$ is shown in FIG. 3.

Finally, as a function of this minimum distance $d_m$, a warning may be triggered 108 in order to inform the crew of the aircraft 20 of a risk of collision between the object 10 and the aircraft 20. The triggering 108 of a warning is then performed when the minimum distance $d_m$ is less than a first threshold corresponding to a first level of collision risk between the object 10 and the aircraft 20.

By way of example, this warning may be a sound warning issued by the warning device 55 giving off sounds or playing a voice announcement. The warning may also be visual, displaying a message or a specific symbol on the screen 56 of the aircraft 20.

The crew of the aircraft 20, and in particular the pilot, are thus informed about the situation of the aircraft 20, namely that there is a first level of risk of collision and that an appropriate avoidance maneuver needs to be performed.

In addition, this avoidance method may comprise one, two, or three operational steps.

For example, the avoidance method may include an additional step of the aircraft 20 performing 109 a maneuver to avoid the object 10 as soon as the minimum distance $d_m$ is less than a second threshold. The second threshold is less than the first threshold and corresponds to a second risk level of collision between the object 10 and the aircraft 20. Specifically, the minimum distance $d_m$ is smaller than before and the risk of collision between the object 10 and the aircraft 20 is greater.

The avoidance maneuver is preferably performed with particular acceleration of the aircraft 20 for maximizing the distance between the first track 16 and the second track 26 corresponding to the particular time value associated with the minimum distance $d_m$. Nevertheless, when the particular acceleration is greater than a limited acceleration, the avoidance maneuver is performed using the limited acceleration in order to preserve the comfort both of the crew and of any passengers on board the aircraft 20.

The aircraft 20 performs 109 the maneuver for avoiding the object 10 automatically, generally by means of the autopilot 24 of the aircraft 20, with avoidance orders being issued by the calculation device 54 to the autopilot 24. This avoidance maneuver is performed 109 in parallel with a warning being triggered 108.

The avoidance method may also include an inhibit step 110 of inhibiting the triggering 108 of a warning and of inhibiting the performance 109 of an avoidance maneuver. This inhibit step 110 avoids an alarm being triggered 109 and avoids an avoidance maneuver being performed 109 when the detected object 10 is far away from the aircraft 20. Specifically, a detected object 10 may initially present a first track that approaches the second track of the aircraft 20, which is characteristic of a risk of collision. Thereafter, the first track of the object 10 may change so as to go away from the second track of the aircraft 20, and the previously determined risk of collision is no longer applicable. By way of example, the inhibit step 110 is activated when the current distance between the object 10 and the aircraft 20 is greater than a distance threshold.

This avoidance method may also include an additional step of displaying 111 the object 10 on the screen 56, which step may be performed in parallel with the other steps of the method. As a result, the pilot of the aircraft 20 can follow how the object 10 is moving relative to the aircraft 20 and how it is approaching the aircraft 20. This display may also show the first track 16 of the object 10 and the second track 26 of the aircraft 20, e.g. as shown in FIG. 3.

Naturally, the present invention may be subjected to numerous variations as to its implementation. Although several implementations are described, it will readily be understood that it is not conceivable to identify exhaustively all possible implementations. It is naturally possible to envisage replacing any of the means described with equivalent means without going beyond the ambit of the present invention.

What is claimed is:

1. A method of avoiding an object by detecting its approach to an aircraft, the aircraft including a detector device and a positioning device, wherein the method comprises the following steps:

detecting an object approaching the aircraft, the object being detected by the detector device;

making a first estimate of successive first states for the object, the successive first states for the object being estimated by the detector device, the first states being constituted by a position, a speed, and/or an acceleration of the object;

making a second estimate of successive second states for the aircraft, the successive second states for the aircraft being estimated by the positioning device, the second states being constituted by a position, a speed, and/or an acceleration of the aircraft;

making a first characterization of a first track for the object as a set of equations as a function of time;

making a second characterization of a second track for the aircraft as a set of equations as a function of time;

making a third estimate of a distance between the first track for the object and the second track for the aircraft;

making a fourth estimate of a minimum distance ($d_m$) between the first track for the object and the second track for the aircraft;

triggering a warning when the minimum distance ($d_m$) is less than a first threshold;

the aircraft performing an avoidance maneuver for avoiding the object as soon as the minimum distance ($d_m$) is less than a second threshold, the second threshold being less than the first threshold, the avoidance maneuver being performed with a particular acceleration of the aircraft serving to maximize the distance between the first track for the object and the second track for the aircraft corresponding to a particular time value associated with the minimum distance ($d_m$);

wherein the first track for the object and the second track for the aircraft are defined respectively from the successive first states for the object and from the successive second states for the aircraft, and are characterized by respective sets of three equations as a function of time, and the distance between the first track for the object and the second track for the aircraft is characterized by a polynomial function of time defined from the two sets of three equations; and wherein the object and the aircraft are considered as having acceleration that is constant, and the first track for the object and the second track for the aircraft are characterized by respective sets of three second order equations such that the distance between the first track for the object and the second track for the aircraft is characterized by a polynomial function of fourth degree.

2. The method according to claim 1, wherein the detector device is formed by an electromagnetic wave detector system, an optical detector system, an imaging system having at least one camera, or indeed an imaging system having at least one camera in combination with an electromagnetic wave detector system or with an optical detector system.

3. The method according to claim 1, wherein the positioning device is formed by at least one GNSS receiver and/or at least one inertial unit.

4. The method according to claim 1, wherein the fourth estimate of the minimum distance ($d_m$) between the first track for the object and the second track for the aircraft is performed by differentiating relative to time the distance between the first track and the second track and by searching for the time value that minimizes the distance.

5. The method according to claim 1, wherein the method includes an additional step of displaying the object on a display device.

6. The method according to claim 1, wherein the particular acceleration is estimated by applying a set of equations determining the distance between the first track for the detected object and the second track for the aircraft and by calculating an acceleration vector for the aircraft that maximizes the minimum distance ($d_m$).

7. The method according to claim 6, wherein the acceleration vector for the aircraft is written in a second reference frame attached to the aircraft.

8. The method according to claim 1, wherein the avoidance maneuver is performed by acting on a roll attitude of the aircraft, a pitch attitude of the aircraft, a load factor of the aircraft, and a variation of the heading of the aircraft induced by the aircraft performing a roll action.

9. The method according to claim 1, wherein the avoidance maneuver is performed:
by coordinating a roll action of the aircraft with a variation of the heading of the aircraft
and with an action on the collective pitch of the aircraft.

10. The method according to claim 1, wherein the particular acceleration of the aircraft for maximizing the distance between the first track for the object and the second track for the aircraft is estimated by differentiating the minimum distance ($d_m$) relative to each of the components of an acceleration vector of the aircraft.

11. The method according to claim 1, wherein when the particular acceleration is greater than a limited acceleration, the avoidance maneuver is performed with the limited acceleration.

12. The method according to claim 1, wherein the aircraft has an autopilot and the avoidance maneuver for avoiding the object by the aircraft is performed by the autopilot, avoidance orders being supplied to the autopilot.

13. An assembly for avoiding an object by detecting its approach to an aircraft, the assembly being for fitting to the aircraft, the assembly comprising:
a detector device for detecting the object and supplying successive first states for the object, the successive first states being constituted by a position, a speed, and/or an acceleration of the object;
a positioning device for positioning the aircraft and providing successive second states for the aircraft, the successive second states being constituted by a position, a speed, and/or an acceleration of the object;
at least one memory for storing calculation instructions, the successive first states for the object, and the successive second states for the aircraft;
at least one calculation device suitable for executing the calculation instructions to make a first characterization of a first track for the object as a set of equations as a function of time, make a second characterization of a second track for the aircraft as a set of equations as a function of time, make a third estimate of a distance between the first track for the object and the second track for the aircraft, and make a fourth estimate of a minimum distance ($d_m$) between the first track for the object and the second track for the aircraft; and
at least one warning device connected to the calculation device to trigger a warning when the minimum distance ($d_m$) is less than a first threshold;
wherein the first track for the object and the second track for the aircraft are defined respectively from the successive first states for the object and from the successive second states for the aircraft, and are characterized by respective sets of three equations as a function of time, and the distance between the first track for the object and the second track for the aircraft is characterized by a polynomial function of time defined from the two sets of three equations; and wherein the object and the aircraft are considered as having acceleration that is constant, and the first track for the object and the second track for the aircraft are characterized by respective sets of three second order equations such that the distance between the first track for the object and the second track for the aircraft is characterized by a polynomial function of fourth degree.

14. The assembly according to claim 13, wherein the detector device is formed by an electromagnetic wave detector system, an optical detector system, an imaging system having at least one camera, or indeed an imaging system having at least one camera in combination with an electromagnetic wave detector system or with an optical detector system.

15. The assembly according to claim 13, wherein the positioning device is formed by at least one GNSS receiver and/or at least one inertial unit.

16. An aircraft comprising:
- a detector device for detecting an object approaching the aircraft and supplying successive first states for the object, the successive first states being constituted by a position, a speed, and/or an acceleration of the object;
- a positioning device for positioning the aircraft and providing successive second states for the aircraft, the successive second states being constituted by a position, a speed, and/or an acceleration of the object;
- at least one memory for storing calculation instructions, the successive first states for the object, and the successive second states for the aircraft;
- at least one calculation device suitable for executing the calculation instructions to make a first characterization of a first track for the object as a set of equations as a function of time, make a second characterization of a second track for the aircraft as a set of equations as a function of time, make a third estimate of a distance between the first track for the object and the second track for the aircraft, and make a fourth estimate of a minimum distance ($d_m$) between the first track for the object and the second track for the aircraft;
- at least one warning device connected to the calculation device to trigger a warning when the minimum distance ($d_m$) is less than a first threshold;
- an autopilot configured to control the aircraft to perform an avoidance maneuver for avoiding the object as soon as the minimum distance ($d_m$) is less than a second threshold, the second threshold being less than the first threshold, the avoidance maneuver being performed with a particular acceleration of the aircraft serving to maximize the distance between the first track for the object and the second track for the aircraft corresponding to a particular time value associated with the minimum distance ($d_m$);

wherein the first track for the object and the second track for the aircraft are defined respectively from the successive first states for the object and from the successive second states for the aircraft, and are characterized by respective sets of three equations as a function of time, and the distance between the first track for the object and the second track for the aircraft is characterized by a polynomial function of time defined from the two sets of three equations; and wherein the object and the aircraft are considered as having acceleration that is constant, and the first track for the object and the second track for the aircraft are characterized by respective sets of three second order equations such that the distance between the first track for the object and the second track for the aircraft is characterized by a polynomial function of fourth degree.

17. The aircraft according to claim 16, wherein the detector device is formed by an electromagnetic wave detector system, an optical detector system, an imaging system having at least one camera, or indeed an imaging system having at least one camera in combination with an electromagnetic wave detector system or with an optical detector system.

18. The aircraft according to claim 16, wherein the positioning device is formed by at least one GNSS receiver and/or at least one inertial unit.

* * * * *